Patented Apr. 16, 1935

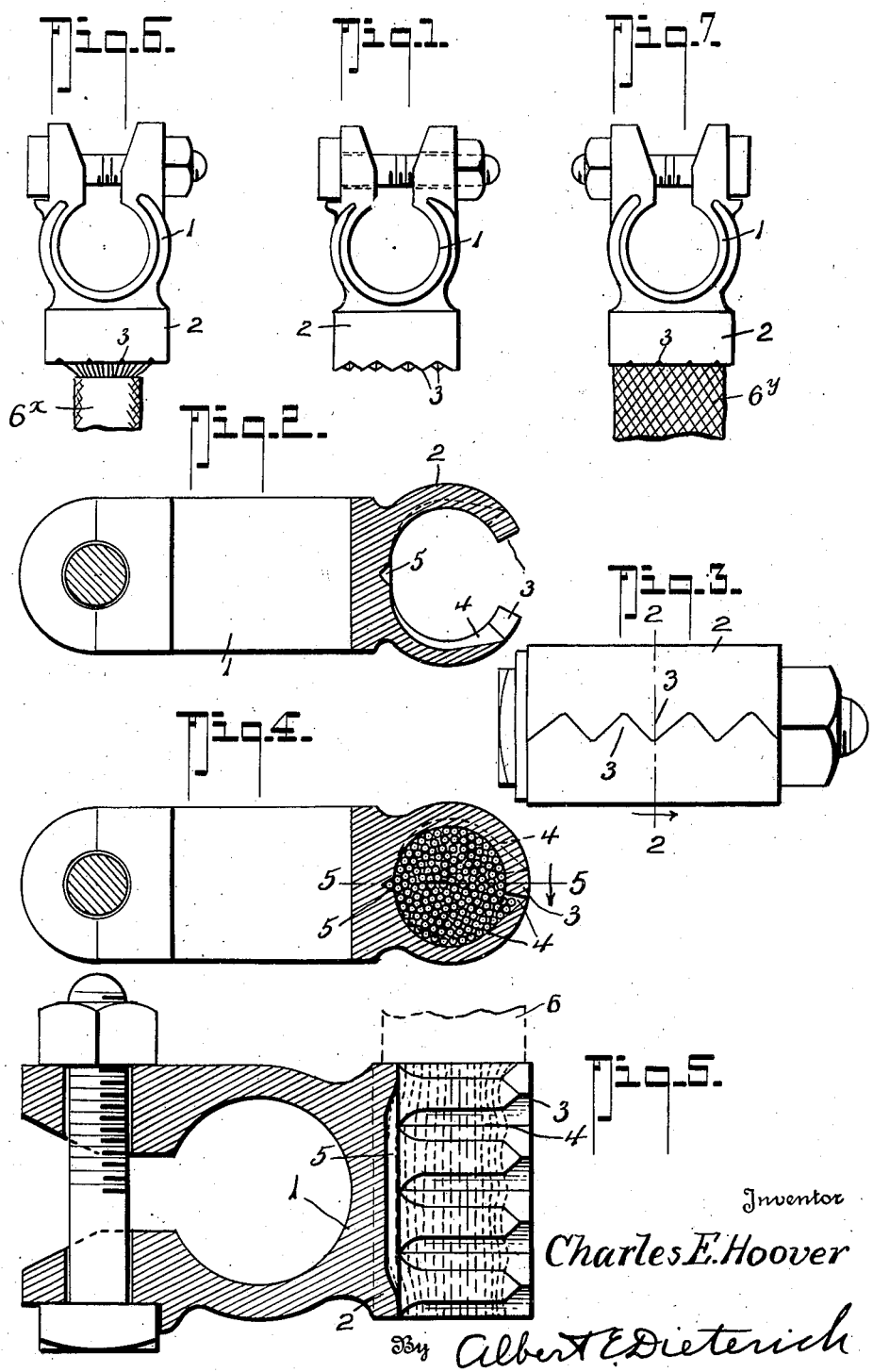

1,998,016

UNITED STATES PATENT OFFICE 1,998,016

BATTERY TERMINAL CONNECTER

Charles E. Hoover, Lancaster, Pa.

Application July 5, 1934, Serial No. 733,929

4 Claims. (Cl. 173—269)

My invention relates to means for securing battery terminal posts and their wire cables together, and it primarily has for its object to provide a solderless connecter by which the cable strands are securely held in place to prevent the cable and the connecter being pulled apart.

Further, the invention has for an object to provide a split clamp connecter with a quickly attachable cable gripper which can be secured to the cable by means of a hammer or vise.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:—

Figure 1 is a plan view of my invention per se.

Figure 2 is an enlarged vertical section on the line 2—2 of Figure 3.

Figure 3 is an elevation showing the jaws of the cable gripper closed.

Figure 4 is a view similar to Figure 2 with the jaws closed around the strands of a cable.

Figure 5 is a section taken substantially on the line 5—5 of Figure 4, the wire strands and cable being indicated in dotted lines.

Figures 6 and 7 are plan views showing how the teeth in the device answer as a means of making an extension grip in installing a repair terminal where the cable is too short.

In the drawing in which like numerals of reference indicate like parts in all the figures, the terminal connecter comprises a body consisting of a split clamp 1 of the usual type for being secured to the terminal post of a battery. The body also includes a cable gripper whose axis extends at right angles to the axis of the clamp 1 and which gripper consist of a pair of semi-cylindrical jaw members 2 having teeth 3 of substantially V-shape in elevation, the teeth of the upper jaw member being staggered with relation to those of the lower jaw member so that when the jaws are closed (see Figure 3) the teeth will interengage and constitute a closure for the cable gripper mouth.

Aligning with the lowest places, or depressions, between the teeth 3 on the upper and lower jaw members are transverse grooves 4 which extend to the outer periphery of the jaw members adjacent the teeth and which form depressions or recesses into which the wire strands of the cable 6 are kinked or bent when the jaws are closed together.

The body of the connecter is also provided with a longitudinal groove 5 whose ends are blind, i. e., the groove does not extend the full length of the gripper. This groove 5 serves to receive a wire strand and clamp it tight as the jaws are hammered together to close them. Thus it will be seen that when the jaws are hammered together to close them the cable strands will be kinked into the grooves 4 and into the triangular recesses formed between the ends of the grooves 4 and the teeth 3 of the opposite jaw (see Figure 4). Also, at least one of the strands will be squeezed into the groove 5 and clamped tightly therein (see Figures 4 and 5). In this way the cable is rigidly held not only in good electrical contact with the connecter, but in such positive mechanical fashion that it is practically impossible to pull the cable out of the connecter, certainly so by any forces met with in practice.

As shown in Figures 6 and 7, the teeth 3 may be used to grip the end of a round cable 6x (see Figure 6) or a flat cable 6y (see Figure 7), as a means of making an extension grip in installing a repair terminal where the cable is too short.

From the foregoing description, taken in connection with the accompanying drawing, it is thought that the construction, combination and arrangement of the invention will be clear to those skilled in the art.

What I claim is:

1. A battery post and cable connecter comprising a body having means to fit on and be secured to a battery post and having a cable gripper comprising a pair of semi-cylindrical jaw members having V-shaped teeth, the teeth of the upper jaw being staggered with respect to those of the lower jaw, at least one of said jaws having transverse grooves aligned with the low places between the teeth thereof and said body having a longitudinal wire-strand-receiving groove located between the semi-cylindrical members diametrically opposite the teeth substantially as shown for the purposes described.

2. A battery post and cable connecter comprising a body having a split clamp with bolt and nut to fit on and be secured to a battery post, said body including a cable gripper comprising a pair of semi-cylindrical jaws having V-shaped teeth, those of the upper jaw being staggered with respect to those of the lower jaw, each of said jaws having transverse grooves and said body having a longitudinal wire-strand-receiving groove located between said semi-cylindrical members and diametrically opposite the teeth thereof substantially as shown for the purposes described.

3. A battery post and cable connecter comprising a body having a split clamp with bolt and nut to fit on and be secured to a battery post, said body including a cable gripper comprising a pair of semi-cylindrical jaws having V-shaped teeth, those of the upper jaw being staggered with respect to those of the lower jaw, each of said jaws having transverse grooves aligned with the lower places between the teeth, and said body having a longitudinal wire-strand receiving groove located between said semi-cylindrical members and diametrically opposite the teeth thereof substantially as shown and for the purposes described.

4. A battery post and cable connecter comprising a body having a split clamp with bolt and nut to fit on and be secured to a battery post, said body including a cable gripper comprising a pair of semi-cylindrical jaws having V-shaped teeth, those of the upper jaw being staggered with respect to those of the lower jaw, each of said jaws having transverse grooves aligned with the low places between the teeth, and said body having a longitudinal wire-strand receiving groove located between said semi-cylindrical members and diametrically opposite the teeth thereof, said wire strand receiving groove terminating short of the ends of the jaws.

CHARLES E. HOOVER.